United States Patent
Tezuka

(10) Patent No.: US 7,028,231 B1
(45) Date of Patent: Apr. 11, 2006

(54) PERFORMANCE MONITORING FOR OPTICAL TRANSMISSION SYSTEM

(75) Inventor: Hiroshi Tezuka, Tokyo (JP)

(73) Assignee: NEC Corporation, Tokyo (JP)

( * ) Notice: Subject to any disclaimer, the term of this patent is extended or adjusted under 35 U.S.C. 154(b) by 802 days.

(21) Appl. No.: 09/704,523

(22) Filed: Nov. 3, 2000

(30) Foreign Application Priority Data

Nov. 4, 1999 (JP) ............................ 11/313167

(51) Int. Cl.
*G06F 11/00* (2006.01)

(52) U.S. Cl. .................. 714/704; 714/752; 714/758

(58) Field of Classification Search ............... 714/704, 714/746, 758, 751, 752, 48, 712, 715, 801, 714/800, 819
See application file for complete search history.

(56) References Cited

U.S. PATENT DOCUMENTS

| | | | |
|---|---|---|---|
| 4,541,091 A * | 9/1985 | Nishida et al. ............. | 714/756 |
| 4,710,976 A | 12/1987 | Wakabayashi et al. | |
| 4,755,993 A | 7/1988 | Grover | |
| 5,528,606 A * | 6/1996 | Kondo et al. ............... | 714/755 |
| 5,615,221 A * | 3/1997 | Karp et al. .................. | 714/752 |
| 5,764,651 A | 6/1998 | Bullock et al. | |
| 5,923,653 A | 7/1999 | Denton | |
| 5,956,324 A | 9/1999 | Engdahl et al. | |
| 6,009,549 A * | 12/1999 | Bliss et al. .................. | 714/769 |
| 6,526,531 B1 * | 2/2003 | Wang .......................... | 714/704 |
| 6,782,044 B1 * | 8/2004 | Wright et al. ............... | 375/224 |

FOREIGN PATENT DOCUMENTS

| | | |
|---|---|---|
| EP | 0 684 712 A2 | 11/1995 |
| JP | 2-26428 | 1/1990 |
| JP | 5-22271 | 1/1993 |
| JP | 5-259924 | 10/1993 |
| JP | 9-130355 | 5/1997 |
| JP | 2000-358007 | 12/2000 |
| WO | WO 99/21316 | 4/1999 |

* cited by examiner

*Primary Examiner*—Phung My Chung
(74) *Attorney, Agent, or Firm*—Foley & Lardner LLP

(57) ABSTRACT

An optical transmission system allowing precise error rate evaluations is disclosed. A transmitting element performs error-correction coding and transmits an error-correction coded transmission signal. A receiving element decodes the reception signal to produce decoding failure information when a decoding failure occurs, and calculates a number of errors after the error correction decoding based on the decoding failure information. The number of errors is determined based on an error-correcting capability of the error correcting code when the calculated parity information does not perfectly match the extracted parity information.

16 Claims, 5 Drawing Sheets

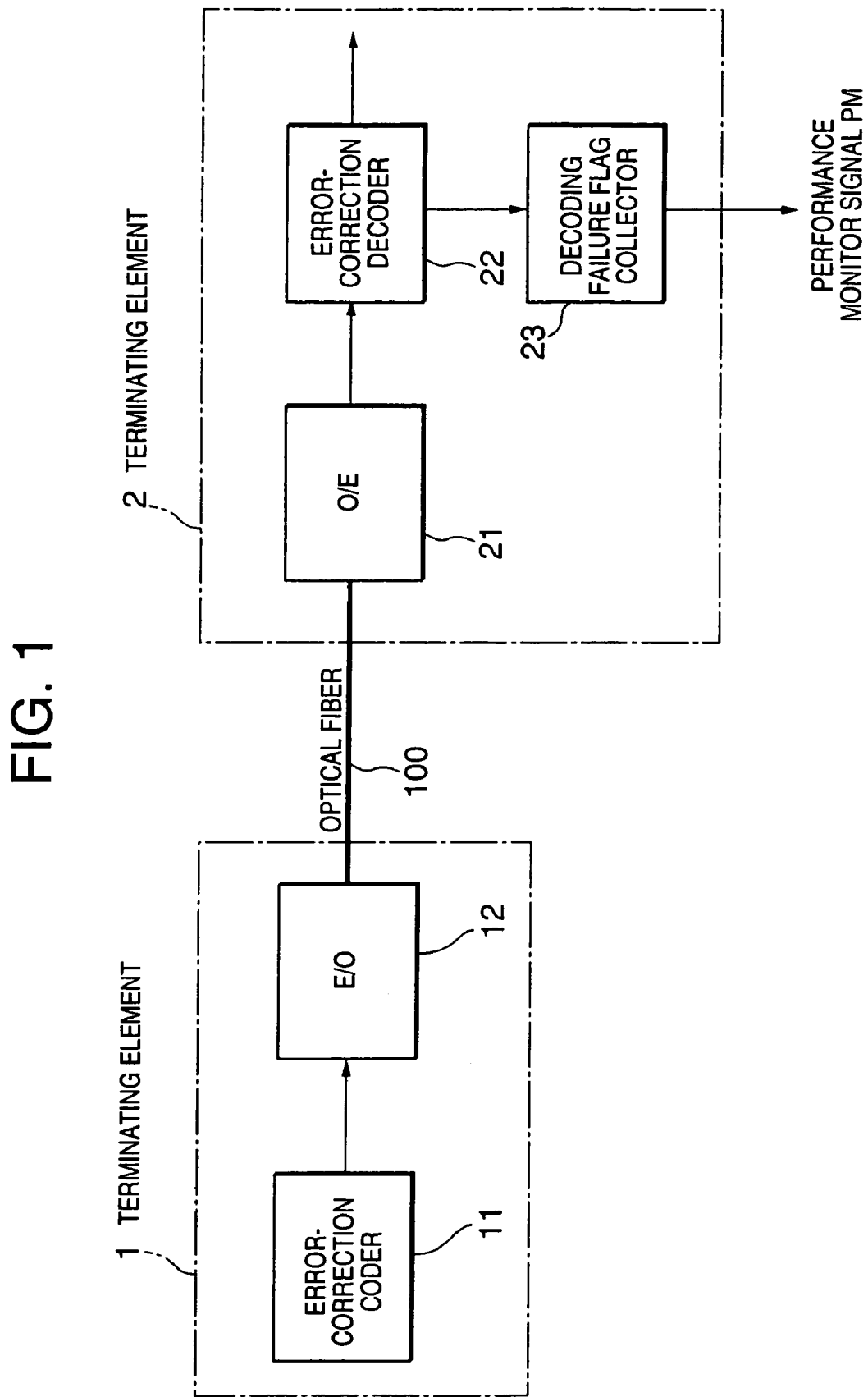

SUBFRAME FORMAT

FIG. 6

| | TRANSPORT OVERHEAD | | | PATH OVERHEAD |
|---|---|---|---|---|
| SECTION OVERHEAD | FRAMING A1 | FRAMING A2 | (STS-ID) C1 | TRACE J1 |
| | BIP-8 B1 | ORDER WIRE E1 | USER F1 | BIP-8 B3 |
| | DATA COM D1 | DATA COM D2 | DATA COM D3 | SIGNAL LABEL C2 |
| LINE OVERHEAD | POINTER H1 | POINTER H2 | POINTER ACTION H3 | PATH STATUS G1 |
| | BIP-8 B2 | APS K1 | APS K2 | USER CHANNEL/ DQDB F2 |
| | DATA COM D4 | DATA COM D5 | DATA COM D6 | INDICATOR H4 |
| | DATA COM D7 | DATA COM D8 | DATA COM D9 | GROWTH/DQDB Z3 |
| | DATA COM D10 | DATA COM D11 | DATA COM D12 | GROWTH Z4 |
| | GROWTH/ SYNC STATUS Z1 | GROWTH/FEBE Z2 | ORDERWIRE E2 | TANDEM CONNECTION Z5 |

TRANSPORT AND PATH OVERHEAD BYTE DESIGNATIONS

PERFORMANCE MONITORING FOR OPTICAL TRANSMISSION SYSTEM

BACKGROUND OF THE INVENTION

1. Field of the Invention

The present invention relates to an optical transmission system and in particular to a performance monitoring technique for large-capacity and long-distance transmission requiring error correction processing.

2. Description of the Related Art

With the recent increase in data transmission capacity, SONET (Synchronous Optical NETwork) or SDH (Synchronous Digital Hierarchy) has been employed as a basic transmission scheme for fiber-optic communication systems.

In the SONET/SDH systems, the parity check bytes such as B1, B2, and B3 in the SONET/SDH frame are used to compute a transmission error rate based on BIP (Bit Interleaved Parity) calculation. The frame format of SONET/SDH is shown in FIG. 6, where B1 byte is used for section (regenerator section for SDH) bit error rate (BER) monitoring, B2 byte for line (multiplex section for SDH) BER monitoring, and B3 byte for path BER monitoring.

A parity check byte is computed from all or a predetermined part of the previous frame for each of section, line and path and is written into a corresponding one of B1, B2 and B3 bytes. Therefore, the transmission BER for each of section, line and path can be computed to allow performance monitoring therefor.

With the vast increase in data transmission capacity, error-correction techniques compensating for transmission errors have been employed in the SONET/SDH systems. In this case, however, the parity check byte cannot be used as it is for performance monitoring after error correction. Hereafter, the details will be described, taking as an example the case of parity check bit for simplicity.

It is assumed that one bit is corrected in an N-bit frame having a parity check bit included in the overhead thereof and an actual transmission error rate is Pe.

In the case where the error correction is not performed, the parity check bit allows one bit error to be detected. Accordingly, an error rate $P_{e\_bip}$ obtained from the parity check bit is calculated by the following expression:

$$P_{e\_bip} = (1/N) \cdot \{1 - (1-Pe)^N\}.$$

According to this expression, if the actual transmission error rate Pe is sufficiently small, then the calculated error rate $P_{e\_bip}$ is approximately equal to the actual transmission error rate Pe.

Contrarily, in the case where the error correction is performed, one bit error is corrected and the number of error bits becomes 0, but k (k>1) bit errors produce (k+1) bit errors due to miscorrection. Therefore, an error rate $P_{e\_fec}$ obtained by performing the error correction is calculated by the following expression:

$$P_{e\_fec} = (1/N) \cdot \sum_{k=0}^{N} (k+1) \cdot {}_N C_k \cdot (Pe)^k (1-Pe)^{N-k}.$$

In this case, the number of error bits counted by the parity check bit calculation is erroneously incremented by 1 when an even number of error bits occurs. Therefore, an error rate $P_{e\_fec\_bip}$ obtained from the parity check bit after the error correction is calculated by the following expression:

$$P_{e\_fec\_bip} = (1/N) \cdot \sum_{k=1}^{N/2} {}_N C_{2k} \cdot (Pe)^{2k}(1-Pe)^{N-2k}.$$

Accordingly, there occurs an error between the error rate $P_{e\_fec}$ obtained after the error correction and the error rate $P_{e\_fec\_bip}$ obtained from the parity check bit after the error correction. If Pe=$10^{-7}$ and N=100, then $P_{e\_fec}$=1.48×$10^{-12}$ and $P_{e\_fec\_bip}$=4.9×$10^{-13}$.

As described above, the conventional performance monitoring technique based on the existing parity calculation cannot provide a precise error rate.

SUMMARY OF THE INVENTION

It is an object of the present invention to provide an optical transmission system and a performance monitoring method allowing precise error rate evaluations.

According to an aspect of the present invention, in an optical transmission system for transmitting a signal having a predetermined frame format from a first element to a second element, the first element includes: an error-correction coder for coding transmission data to produce a transmission signal subjected to error-correction coding; and a transmitter for transmitting the transmission signal to the second element. The second element includes; a receiver for receiving a reception signal subjected to the error-correction coding from the first element; an error-correction decoder for decoding the reception signal to produce decoding failure information; and a decoding failure collector for calculating a number of errors after the error correction decoding based on the decoding failure information.

The decoding failure collector may include an error counter for determining a number of errors based on an error-correcting capability of the error correcting code when a decoding failure occurs. The number of errors may be determined to be a number greater than the error-correcting capability.

According to another aspect of the present invention, the first element includes: a first parity calculator for calculating parity information from a frame of transmission data; an overhead controller for inserting the parity information into an overhead of a next frame of the transmission data; an error-correction coder for coding the transmission data with the parity information to produce a transmission signal subjected to error-correction coding; and a transmitter for transmitting the transmission signal to the second element. The second element includes: a receiver for receiving a reception signal subjected to the error-correction coding from the first element; an error-correction decoder for decoding the reception signal to produce reception data; a second parity calculator for calculating parity information from a frame of the reception data; a parity comparator for comparing the calculated parity information with parity information extracted from a next frame of the reception data to determine whether the calculated parity information perfectly matches the extracted parity information; and a disparity collector for calculating a number of errors after the error correction decoding based on a comparison result of the parity comparator.

According to still another aspect of the present invention, in an optical transmission system for transmitting a signal having a predetermined frame format from a first element to a second element via at least one element, wherein the first and second elements form a switching section of the optical transmission system, the first element includes: a first parity calculator for calculating parity information from a frame of transmission data; an overhead controller for inserting the parity information into a predetermined location in an overhead of a next frame of the transmission data, wherein the predetermined location is provided for monitoring the switching section; an error-correction coder for coding the transmission data with the parity information to produce a transmission signal subjected to error-correction coding; and a transmitter for transmitting the transmission signal to the second element. The second element includes: a receiver for receiving a reception signal subjected to the error-correction coding from the first element; an error-correction decoder for decoding the reception signal to produce reception data; a second parity calculator for calculating parity information from a frame of the reception data; a parity comparator for comparing the calculated parity information with parity information extracted from the predetermined location of a next frame of the reception data to determine whether the calculated parity information perfectly matches the extracted parity information; and a disparity collector for calculating a number of errors after the error correction decoding based on a comparison result of the parity comparator.

Parity checking may be performed at each of the at least one element and the second element using parity information inserted into another predetermined location in an overhead of a next frame of the transmission data.

BRIEF DESCRIPTION OF THE DRAWINGS

FIG. 1 is a diagram showing an optical transmission system according to a first embodiment of the present invention;

FIG. 6 is a diagram showing a frame format used in the conventional transmission system.

DETAILED DESCRIPTION OF THE PREFERRED EMBODIMENTS

First Embodiment

Figure 2A:
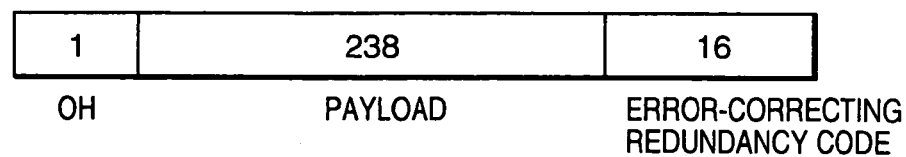
FIG. 2A is a diagram showing a subframe format used in the first embodiment.

As shown in FIG. 1, it is assumed for simplicity that an optical communication network is composed of terminating elements 1 and 2, which are connected through an optical fiber 100.

The terminating element 1 includes an error-correction coder 11 and an electro-optic transducer (E/O) 12. The error-correction coder 11 uses an existing error-correcting code such as Reed-Solomon code. The terminating element 2 includes an opto-electronic transducer (O/E) 21, an error-correction decoder 22, and a decoding failure flag collector 23. The error-correction decoder 22 uses the same error-correcting code as the error-correction coder 11 to perform the error-correction decoding and generates a decoding failure flag when the error correction fails. The decoding failure flag collector 23 counts the number of decoding failure flags and outputs the number of equivalent error bytes as a performance monitor signal PM, which will be described hereafter.

More specifically, taking as an example the case of a transmission frame composed of multiple subframes, the first embodiment will be described in detail.

Figure 2B:
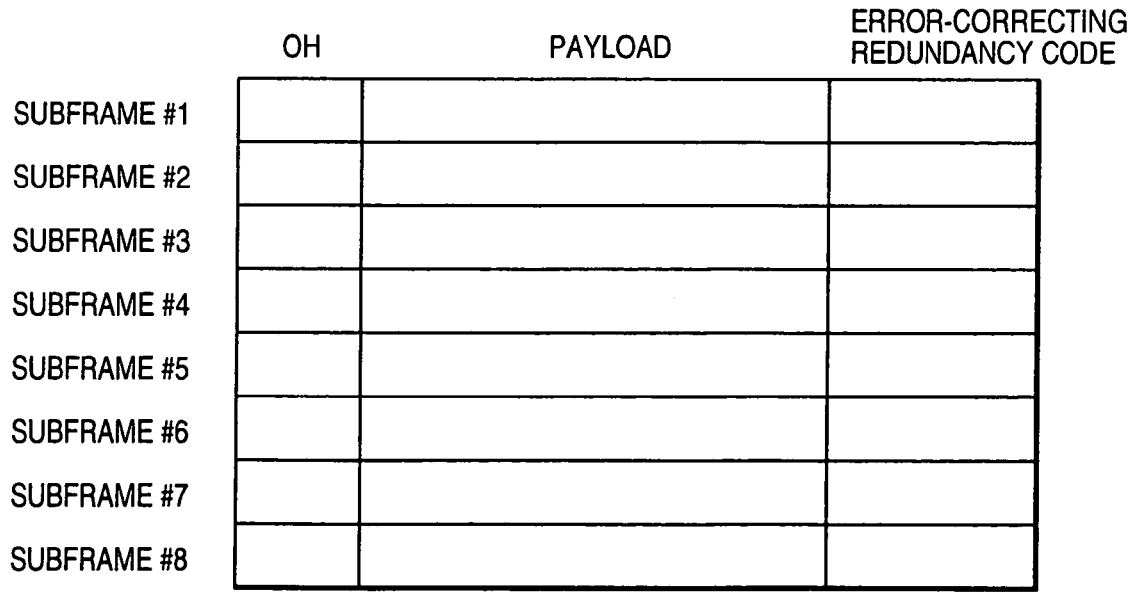
FIG. 2B is a diagram showing a frame format used in the first embodiment.

As shown in FIGS. 2A and 2B, a transmission frame is composed of 64 subframes, each of which consists of 1-byte overhead, 238-byte payload, and 16-error byte-correcting redundancy code.

At the terminating element 1, a frame of signal to be transmitted is coded by the error-correction coder 11. The error-correction code is assumed to allow up to 8 error bytes per subframe to be corrected. The value obtained from the error-correction coding is inserted into the error-correcting redundancy code byte of the frame. The frame of signal is converted into optical signal by the E/O 12 and then is transmitted to the other end.

At the terminating element 2, when receiving the optical signal from the terminating element 1, the O/E 21 converts the received optical signal to a corresponding electric signal and outputs it to the error-correction decoder 22.

The error-correction decoder 22 decodes the received signal to produce a received frame of signal and, if error correction fails, then a decoding failure flag is output to the decoding failure flag collector 23. As described before, since the error-correction code allows up to 8 error bytes per subframe to be corrected, 9 or more error bytes cannot be precisely corrected. When 9 or more error bytes occur, the error-correction decoder 22 generates a decoding failure flag. Such a decoding failure flag is collected by the decoding failure flag collector 23 and a collection of decoding failure flags can be used to estimate the error state of a frame.

More specifically, when a decoding failure flag is generated, the decoding failure flag collector 23 counts it as, for example, 9 error bytes because a decoding failure flag is generated when 9 or more error bytes occur. The value obtained by multiplying the decoding failure flag count by 9 is output as the performance monitoring signal PM. Therefore, the signal error rate after error correction can be evaluated with less error.

Second Embodiment

Figure 3:
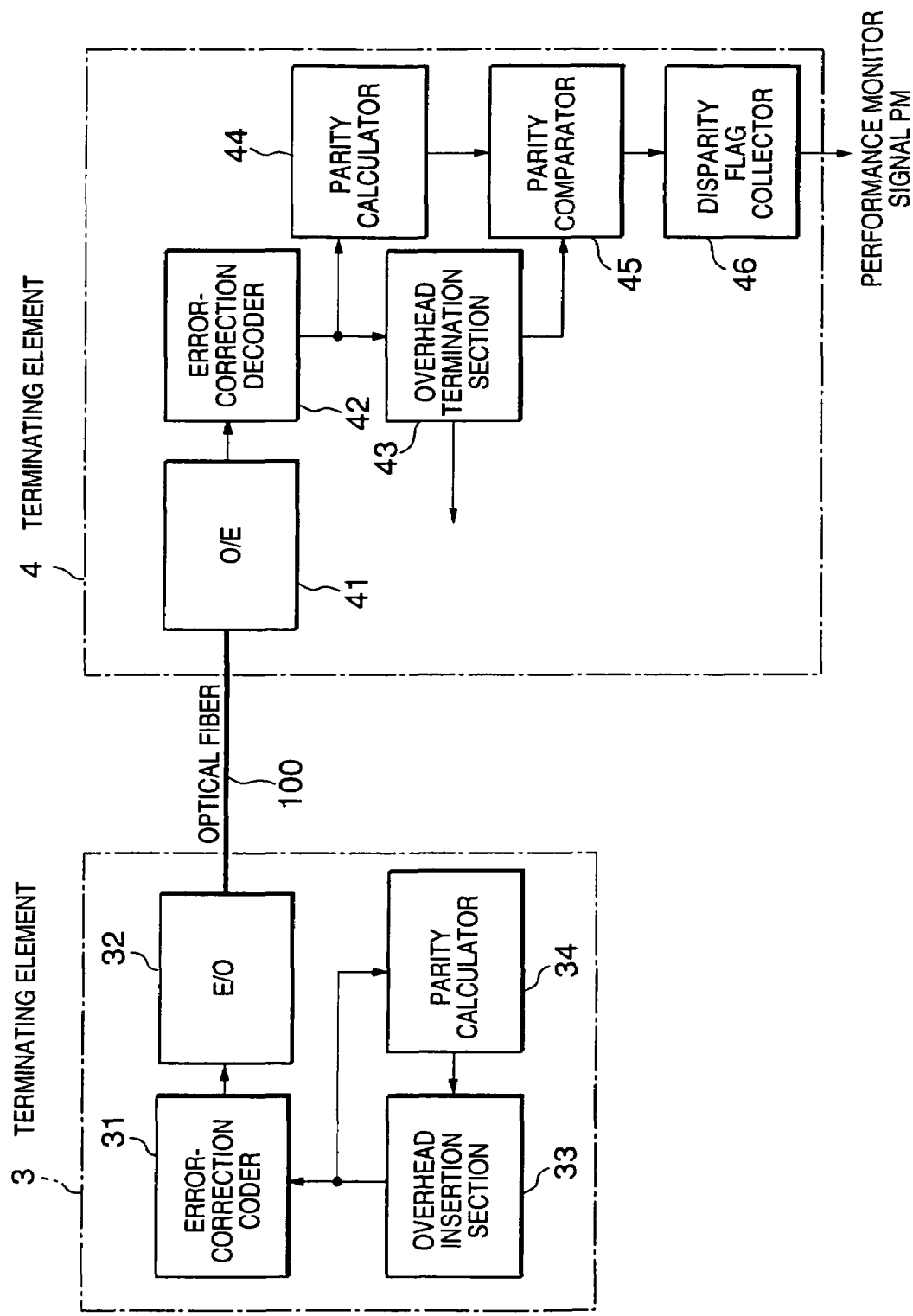
FIG. 3 is a diagram showing an optical transmission system according to a second embodiment of the present invention.

As shown in FIG. 3, it is assumed for simplicity that an optical communication network is composed of terminating elements 3 and 4, which are connected through an optical fiber 100. A signal transmitted from the terminating element 3 to the terminating element 4 has the same frame format as that of the first embodiment.

The terminating element 3 includes an error-correction coder 31, an electro-optic transducer (E/O) 32, an overhead insertion section 33, and a parity calculator 34. The parity calculator 34 performs parity calculation of a frame before error correction coding. The overhead insertion section 33 writes the result of parity calculation into the predetermined overhead byte of a next frame and outputs it to the error-correction coder 31. Operations of the error-correction coder 31 and the E/O 32 are the same as those of the error-correction coder 11 and the E/O 12 in the first embodiment.

The terminating element 4 includes an opto-electronic transducer (O/E) 41 and an error-correction decoder 42, which are the same as the O/E 21 and the error-correction decoder 22 of the first embodiment. The terminating element 4 further includes an overhead termination section 43, a parity calculator 44, a parity comparator 45, and a disparity flag collector 46.

The overhead termination section 43 terminates the overhead of a received signal inputted from the error-correction decoder 42 and extracts the parity check byte from the overhead thereof. The extracted parity check byte is output to the parity comparator 45.

The parity calculator 44 inputs the received signal from the error-correction decoder 42 and performs the parity calculation of the received signal to output the result of parity calculation to the parity comparator 45.

The parity comparator 45 compares the extracted parity check byte with the result of parity calculation to determine whether the extracted parity check byte perfectly matches the result of parity calculation. When all the bits of the extracted parity check byte match those of the result of parity calculation, that is, they perfectly match, it is determined that no error occurs in the frame, and the disparity flag is reset.

However, when at least one bit of the extracted parity check byte does not match the counterpart of the result of parity calculation, that is, they do not perfectly match, it is determined that the error correction fails, and the disparity flag is set. The disparity flag collector 46 collects the set disparity flag to be used for frame error estimation.

More specifically, as described before, since the error-correction code allows up to 8 error bytes per subframe to be corrected, a set disparity flag indicates 9 or more error bytes in a subframe. Here, the disparity flag collector 46 counts a set disparity flag as 9 error bytes, for example. The value obtained by multiplying the set disparity flag count by 9 is output as the performance monitoring signal PM. Therefore, the signal error rate after error correction can be evaluated with less error.

As in the case of parity calculation of SONET/SDH, it is possible to calculate an error rate with more precision by using a theoretical error for interpolation of an error rate derived from the sum of all error bits of the value obtained by parity calculation.

Third Embodiment

Figure 4:
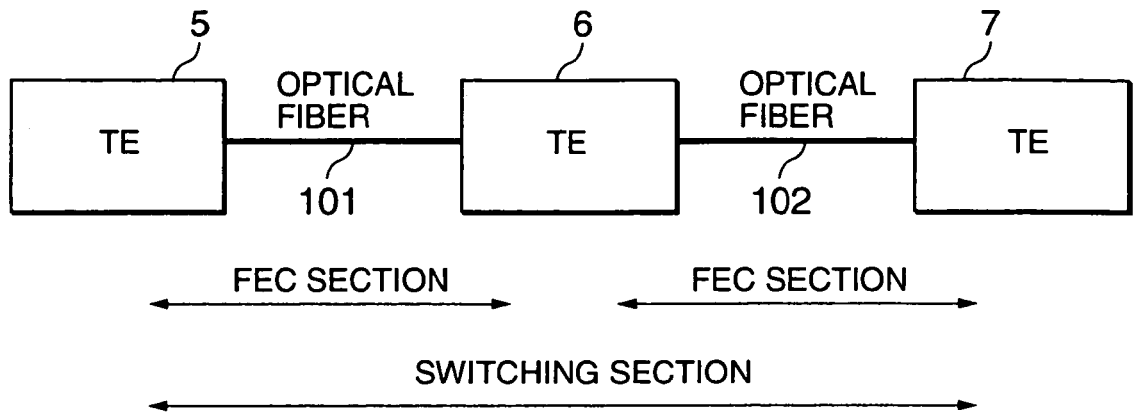
FIG. 4 is a diagram showing an optical transmission system according to a third embodiment of the present invention.

As shown in FIG. 4, It is assumed for simplicity that an optical communication system is composed of terminating elements 5, 6, and 7, where the terminating elements 5 and 6 are connected through an optical fiber 101 and the terminating elements 6 and 7 are connected through an optical fiber 102.

The terminating element 5 has the same circuit configuration as the terminating element 3 of FIG. 3 and the terminating element 7 has the same circuit configuration as the terminating element 4 of FIG. 3. Further, the terminating elements 5 and 7 have a switching function that is used to switch a path in case of occurrence of failure.

The terminating element 6 is a combination of the terminal elements 3 and 4 of FIG. 3. More specifically, the terminating element 6 includes a receiving circuit connected to the terminating element 5 through the optical fiber 101, the receiving circuit having the same circuit configuration as shown in the terminal element 4. The terminating element 6 further includes a transmitting circuit connected to the terminating element 7 through the optical fiber 102, the transmitting circuit having the same circuit configuration as shown in the terminal element 3.

In the case where a signal destined for the terminating element 7 is transmitted from the terminating element 5, at the terminating element 6 receiving the signal destined for the terminating element 7, after error-correction decoding, the decoded signal is coded by the error-correction coder and then is transmitted to the terminating element 7. On the other hand, when a signal destined for the terminating element 6 itself is received from the terminating element 5, the terminating element 6 performs the same receiving operation as the terminating element 4 of FIG. 3.

In the communication system as shown in FIG. 4, the parity check is performed in FEC (forward error correction) section between the terminating elements 5 and 6 and in FEC section between the terminating elements 6 and 7 as described in the second embodiment.

However, as described before, the terminating element 6 decodes the received signal and subsequently codes the decoded signal to transmit it to the terminating element 7. Therefore, the terminating element 7 cannot obtain any information about error-correction decoding failure occurring at the terminating element 6.

Figure 5:
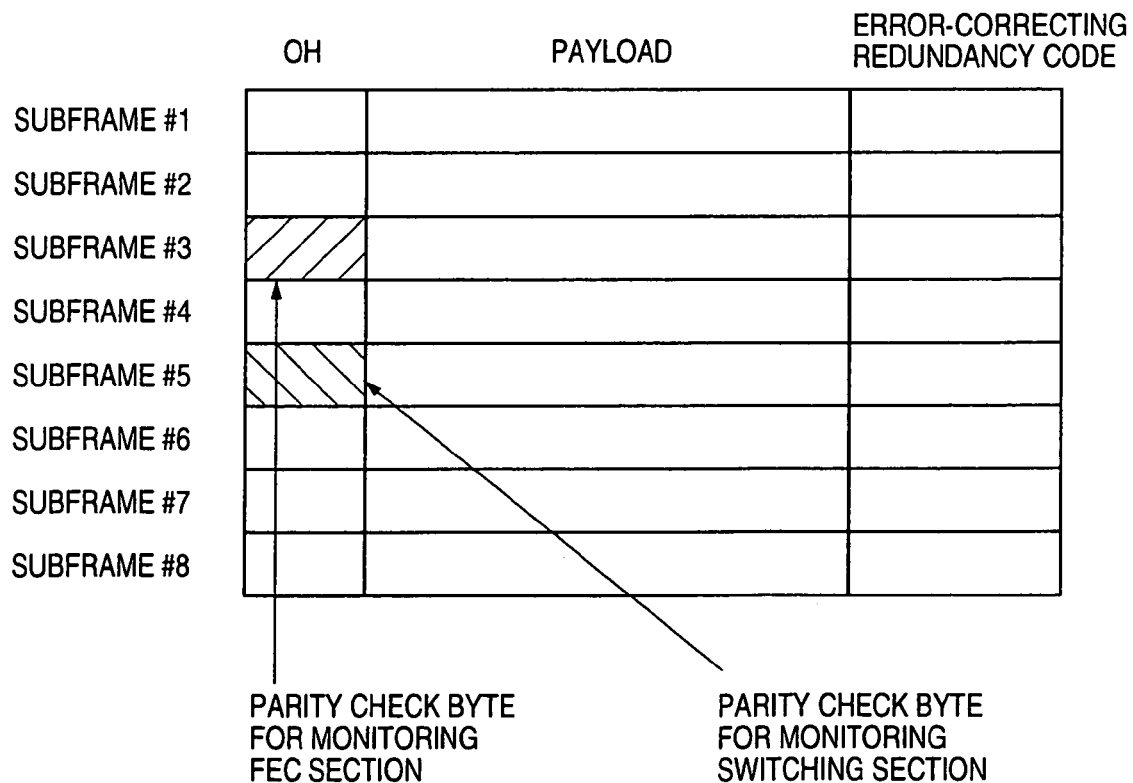
FIG. 5 is a diagram showing a frame format used in the third embodiment.

According to the third embodiment, in order to provide the terminating element 7 with information about error-correction decoding failure occurring at the terminating element 6, a parity check byte for a switching section between the terminating elements 5 and 7 is inserted into the predetermined overhead of a frame in addition to the parity check byte for the FEC section as shown in FIG. 5.

Referring to FIG. 5, a transmission frame transmitted in FEC sections and switching section as shown in FIG. 4 is composed of 64 subframes, each of which consists of 1-byte overhead, 238-byte payload, and 16-error byte-correcting redundancy code. In this example, the parity check byte for monitoring FEC section is written in the overhead of the subframe #3, and the parity check byte for monitoring the switching section is written in the overhead of the subframe #5.

As described before, when the terminating element 6 receives a signal destined for the terminating element 7, the received signal is decoded and then the decoded signal is coded by the error-correction coder. Accordingly, when the error correction decoding fails, the decoded signal including byte errors is coded as it is by the error-correction coder to transmit it to the terminating element 7. At this stage, the result of parity calculation in the frame becomes different from the parity check value inserted in the overhead at the terminating element 5. This disparity is not eliminated even if the error correction is performed at both the terminating elements 6 and 7. Therefore, by comparing the parity check value inserted in the overhead with the result of parity calculation, the terminating element 7 can determine whether a transmission error occurs somewhere between the terminating elements 5 and 7. In this manner, as in the case of the second embodiment, the transmission error evaluation can be performed.

Although the above-mentioned embodiments of the present invention have been described herein, it should be apparent to those skilled in the art that this invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

The invention claimed is:

1. An optical transmission system for transmitting a signal having a predetermined frame format from a first element to a second element, wherein
the first element comprises:
an error-correction coder for coding transmission data to produce a transmission signal subjected to error-correction coding, said error-correction coding allowing for correction of a given number of errors; and
a transmitter for transmitting the transmission signal to the second element, and
the second element comprises:
a receiver for receiving a reception signal subjected to the error-correction coding from the first element;
an error-correction decoder for decoding the reception signal to produce decoding failure information, said decoding failure information including a decoding failure flag in the case that the decoding of the reception signal fails; and
a decoding failure collector for counting a number of decoding failure flags produced by the error-correction decoder to determine a decoding failure flag count, and for calculating a number of errors after the error correction decoding based on the decoding failure information, said calculating including multiplying said decoding failure flag count by a number greater than said given number.

2. An optical transmission system for transmitting a signal having a predetermined frame format from a first element to a second element, wherein
the first element comprises:
a first parity calculator for calculating parity information from a frame of transmission data;
an overhead controller for inserting the parity information into an overhead of a next frame of the transmission data;
an error-correction coder for coding the transmission data with the parity information to produce a transmission signal subjected to error-correction coding; and
a transmitter for transmitting the transmission signal to the second element, and
the second element comprises:
a receiver for receiving a reception signal subjected to the error-correction coding from the first element;
an error-correction decoder for decoding the reception signal to produce reception data;
a second parity calculator for calculating parity information from a frame of the reception data;
a parity comparator for comparing the calculated parity information with parity information extracted from a next frame of the reception data to determine whether the calculated parity information perfectly matches the extracted parity information; and
a disparity collector for calculating a number of errors after the error correction decoding based on a comparison result of the parity comparator.

3. The optical transmission system according to claim 2, wherein the disparity collector comprises:
an error counter for determining a number of errors based on an error-correcting capability of the error correcting code when the calculated parity information does not perfectly match the extracted parity information.

4. The optical transmission system according to claim 3, wherein the number of errors is determined to be a number greater than the error-correcting capability.

5. The optical transmission system according to claim 3, wherein the number of errors is determined to be a number greater than the error-correcting capability.

6. An optical transmission system for transmitting a signal having a predetermined frame format from a first element to a second element via at least one element, wherein the first and second elements form a switching section of the optical transmission system, wherein
the first element comprises:
a first parity calculator for calculating parity information from a frame of transmission data;
an overhead controller for inserting the parity information into a predetermined location in an overhead of a next frame of the transmission data, wherein the predetermined location is provided for monitoring the switching section;
an error-correction coder for coding the transmission data with the parity information to produce a transmission signal subjected to error-correction coding; and
a transmitter for transmitting the transmission signal to the second element, and
the second element comprises:
a receiver for receiving a reception signal subjected to the error-correction coding from the first element;
an error-correction decoder for decoding the reception signal to produce reception data;
a second parity calculator for calculating parity information from a frame of the reception data;
a parity comparator for comparing the calculated parity information with parity information extracted from the predetermined location of a next frame of the reception data to determine whether the calculated parity information perfectly matches the extracted parity information; and
a disparity collector for calculating a number of errors after the error correction decoding based on a comparison result of the parity comparator.

7. The optical transmission system according to claim 6, wherein parity checking is performed at each of the at least one element and the second element using parity information inserted into another predetermined location in an overhead of a next frame of the transmission data.

8. The optical transmission system according to claim 6, wherein the disparity collector comprises:
an error counter for determining a number of errors based on an error-correcting capability of the error correcting code when the calculated parity information does not perfectly match the extracted parity information.

9. A performance monitoring method in an optical transmission system for transmitting a signal having a predetermined frame format from a first element to a second element, the method comprising the steps of:
at the first element,
a) coding transmission data to produce a transmission signal subjected to error-correction coding, said error-correction coding allowing for correction of a given number of errors; and
b) transmitting the transmission signal to the second element;
at the second element,
c) receiving a reception signal subjected to the error-correction coding from the first element;
d) decoding the reception signal to produce decoding failure information, said decoding failure information including a decoding failure flag in the case that the decoding of the reception signal fails;

e) counting a number of decoding failure flags produced during the decoding of the reception signal to determine a decoding failure flag count;

f) calculating a number of errors after the error correction decoding based on the decoding failure information, said calculating step including multiplying said decoding failure flag count by a number greater than said given number; and g) evaluating an error rate from the number of errors.

10. A performance monitoring method in an optical transmission system for transmitting a signal having a predetermined frame format from a first element to a second element, the method comprising the steps of:

at the first element,
   a) calculating parity information from a frame of transmission data;
   b) inserting the parity information into an overhead of a next frame of the transmission data;
   c) coding the transmission data with the parity information to produce a transmission signal subjected to error-correction coding;
   d) transmitting the transmission signal to the second element;

at the second element,
   e) receiving a reception signal subjected to the error-correction coding from the first element;
   f) decoding the reception signal to produce reception data;
   g) calculating parity information from a frame of the reception data;
   h) comparing the calculated parity information with parity information extracted from a next frame of the reception data to determine whether the calculated parity information perfectly matches the extracted parity information;
   i) calculating a number of errors after the error correction decoding based on a comparison result of the step (h); and
   j) evaluating an error rate from the number of errors.

11. The method according to claim 10, wherein the step (i) comprises the step of determining a number of errors based on an error-correcting capability of the error correcting code when the calculated parity information does not perfectly match the extracted parity information.

12. The method according to claim 11, wherein the number of errors is determined to be a number greater than the error-correcting capability.

13. A performance monitoring method in an optical transmission system for transmitting a signal having a predetermined frame format from a first element to a second element via at least one element, wherein the first and second elements form a switching section of the optical transmission system, the method comprising the steps of:

at the first element,
   a) calculating parity information from a frame of transmission data;
   b) inserting the parity information into a predetermined location in an overhead of a next frame of the transmission data, wherein the predetermined location is provided for monitoring the switching section;
   c) coding the transmission data with the parity information to produce a transmission signal subjected to error-correction coding;
   d) transmitting the transmission signal to the second element;

at the second element,
   e) receiving a reception signal subjected, to the error-correction coding from the first element;
   f) decoding the reception signal to produce reception data;
   g) calculating parity information from a frame of the reception data;
   h) comparing the calculated parity information with parity information extracted from the predetermined location of a next frame of the reception data to determine whether the calculated parity information perfectly matches the extracted parity information;
   i) calculating a number of errors after the error correction decoding based on a comparison result of the step (h); and
   j) evaluating an error rate from the number of errors.

14. The method according to claim 13, wherein parity checking is performed at each of the at least one element and the second element using parity information inserted into another predetermined location in an overhead of a next frame of the transmission data.

15. The method according to claim 13, wherein the step (i) comprises the step of determining a number of errors based on an error-correcting capability of the error correcting code when the calculated parity information does not perfectly match the extracted parity information.

16. The method according to claim 15, wherein the number of errors is determined to be a number greater than the error-correcting capability.

* * * * *